(12) United States Patent
Sinha et al.

(10) Patent No.: US 11,570,792 B2
(45) Date of Patent: Jan. 31, 2023

(54) SYSTEM AND METHOD FOR CONFIGURING COMMUNICATION INTERVAL FOR SENSING DEVICE/S

(71) Applicant: Carrier Corporation, Palm Beach Gardens, FL (US)

(72) Inventors: Saurabh Kumar Sinha, Telangana (IN); Ankit Sarin, Telangana (IN); Prakash Jayvant Nitsure, Telangana (IN); Ravi Kumar Kandhi, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 146 days.

(21) Appl. No.: 16/942,318

(22) Filed: Jul. 29, 2020

(65) Prior Publication Data
US 2021/0037548 A1 Feb. 4, 2021

(30) Foreign Application Priority Data

Jul. 31, 2019 (IN) .............................. 201911030991

(51) Int. Cl.
*H04W 72/06* (2009.01)
*H04W 72/12* (2009.01)
*H04B 17/318* (2015.01)
*H04W 84/18* (2009.01)

(52) U.S. Cl.
CPC ...... *H04W 72/1247* (2013.01); *H04B 17/318* (2015.01); *H04W 84/18* (2013.01)

(58) Field of Classification Search
CPC .............. H04W 72/1247; H04W 84/18; H04B 17/318; H04B 17/27
See application file for complete search history.

(56) References Cited

U.S. PATENT DOCUMENTS

| 7,595,723 | B2 | 9/2009 | Heitzmann et al. |
| 7,701,858 | B2 | 4/2010 | Werb et al. |
| 7,764,958 | B2 | 7/2010 | Townshend et al. |
| 8,040,828 | B2 | 10/2011 | Kim et al. |
| 8,325,627 | B2 | 12/2012 | Pratt, Jr. et al. |
| 8,478,292 | B2 | 7/2013 | Kim et al. |
| 8,582,481 | B2 | 11/2013 | Kim et al. |

(Continued)

FOREIGN PATENT DOCUMENTS

| CN | 103379608 A | 10/2013 |
| CN | 103687000 A | 3/2014 |

(Continued)

*Primary Examiner* — Edan Orgad
*Assistant Examiner* — Malick A Sohrab
(74) *Attorney, Agent, or Firm* — Cantor Colburn LLP

(57) ABSTRACT

Aspects of the invention are directed towards a system and a method for configuring a communication interval of one or more sensing devices. One or more embodiments of the invention describe a method comprising steps of receiving a signal strength value from one or more sensing devices and determining an apparent distance between a regulating device and each of the one or more sensing devices based on the signal strength value. The method further comprising step dynamically ranking the one or more sensing devices based on the apparent distance and based on the ranking of the one or more sensing devices, configuring a communication interval for each of the one or more sensing devices.

14 Claims, 3 Drawing Sheets

(56) References Cited

U.S. PATENT DOCUMENTS

| | | | |
|---|---|---|---|
| 8,787,332 B2 | 7/2014 | Ha et al. | |
| 9,019,110 B2 | 4/2015 | Kates | |
| 9,019,111 B1 | 4/2015 | Sloo et al. | |
| 9,251,699 B2 | 2/2016 | Greene et al. | |
| 9,641,964 B2 | 5/2017 | Kulkarni et al. | |
| 9,846,220 B2 | 12/2017 | Kong et al. | |
| 10,156,852 B2 | 12/2018 | Bakhishev et al. | |
| 2004/0252659 A1* | 12/2004 | Yun | H04W 76/10 370/328 |
| 2005/0192037 A1* | 9/2005 | Nanda | H04W 72/1278 455/509 |
| 2011/0051695 A1* | 3/2011 | Dinan | H04W 72/1231 370/336 |
| 2013/0197955 A1* | 8/2013 | Dillon | H04W 40/246 705/7.13 |
| 2016/0066319 A1* | 3/2016 | Sakata | H04W 52/0203 370/336 |
| 2017/0026814 A1 | 1/2017 | Naiki et al. | |
| 2018/0097572 A1 | 4/2018 | Shibata et al. | |
| 2018/0097830 A1 | 4/2018 | Shibata et al. | |
| 2018/0352493 A1* | 12/2018 | Strater | H04W 36/08 |
| 2019/0007354 A1 | 3/2019 | Yang et al. | |
| 2019/0076698 A1 | 3/2019 | Yang et al. | |
| 2019/0101304 A1 | 4/2019 | Yoon | |
| 2019/0306880 A1* | 10/2019 | Ribeiro Blard | H04B 1/69 |

FOREIGN PATENT DOCUMENTS

| | | |
|---|---|---|
| CN | 105407527 A | 3/2016 |
| CN | 108668256 A | 10/2018 |
| DE | 102006022933 A1 | 11/2007 |
| KR | 20180062015 A | 6/2018 |

\* cited by examiner

SYSTEM AND METHOD FOR CONFIGURING COMMUNICATION INTERVAL FOR SENSING DEVICE/S

FOREIGN PRIORITY

This application claims priority to India Patent Application No. 201911030991, filed Jul. 31, 2019, and all the benefits accruing therefrom under 35 U.S.C. § 119, the contents of which in its entirety are herein incorporated by reference.

TECHNICAL FIELD OF INVENTION

The present invention relates generally to communications. More particularly, the invention relates to a system and a method for configuring communication interval for one or more sensing devices.

BACKGROUND OF THE INVENTION

With the advancement in the technology, one or more wireless devices can communicate with a master wireless device through wireless communication. In order to communicate with the master wireless device through the wireless communication, the one or more wireless devices transmit information in the form of packets to the master wireless device. In particular, the one or more wireless devices may act as a transmitter to transmit the packets to the master wireless device and the master wireless device may act as a receiver to receive the packets from the one or more wireless devices. Also, the one or more wireless devices as well as the master wireless device can transmit and receive the packets simultaneously, thereby acting as both the transmitter as well as the receiver at the same time.

However, some of the packets get lost or dropped in between the transmission of the packets before reaching the master wireless device. The packets may be lost due to poor signal strength of communication between the wireless devices and the master wireless device. The signal strength may be poor due to distant location of the wireless device with poor network. Also, the wireless devices may have poor signal strength due to presence of obstacle/s around the wireless devices. Another possible reason for the packet losses is the collision of the packets emerging from the wireless devices. The collision between the packets may occur as the wireless devices communicate with the master wireless device at the same time during fixed time communication interval. As the wireless devices transmit the packets in the same time interval to the master wireless device, the packets from the wireless devices collide with each other before reaching the master wireless device resulting in loss of packets. Such collisions of packets also results in drainage of battery of the wireless devices unnecessarily. as the wireless devices need to retransmit the packets which gets lost in between the transmission. Battery power is a critical parameter for the working of the wireless devices.

In view of afore-mentioned problems, there is a need of an effective system and a method for minimizing the loss of packets due to the poor signal strength of the wireless devices and avoiding collision of the packets during communication. There is also a requirement of a system and a method for saving battery life of the wireless devices. In order to solve the problems in the existing solutions, a system and a method is disclosed that addresses the afore-mentioned problems.

SUMMARY OF THE INVENTION

Various embodiments of the invention describe a method and a system for configuring a communication interval for one or more sensing devices. The invention discloses a method comprising the steps of receiving a signal strength value from one or more sensing devices and determining an apparent distance between a regulating device and each of the one or more sensing devices based on the signal strength value. The method further comprising the steps of dynamically ranking the one or more sensing devices based on the apparent distance and based on the ranking of the one or more sensing devices, configuring a communication interval for each of the one or more sensing devices.

In an embodiment of the invention, the communication interval includes a broadcasting interval and a connection interval for each of the one or more sensing devices while communicating with the regulating device.

In a further embodiment of the invention, an offset is added to the communication interval of each of the sensing device in order of ranking, wherein the offset is added to each of the sensing devices.

In yet another embodiment of the invention, adding the offset comprises adding a first offset to the connection interval and adding a second offset to the broadcast interval of the communication interval.

In a different embodiment of the invention, the ranking includes creating a list of the one or more sensing devices based on the apparent distance, wherein a sensing device with more apparent distance is ranked higher while a sensing device with less apparent distance is ranked lower.

In another embodiment of the invention, the higher ranked sensing device is more favorite sensing device in the list and the lower ranked sensing device is less favorite sensing device in the list.

In a further embodiment of the invention, the regulating device is further configured to determine failure count of received data packets from the sensing devices, wherein the ranking of the one or more sensing devices is further based on the failure count of received data packets and the apparent distance.

In yet another embodiment of the invention, the configuration of the communication interval includes increasing a communication time interval for the higher ranked sensing device and reducing a communication time interval for the lower ranked sensing device.

In a still another embodiment of the invention, the configuration of the communication interval is performed for minimizing packets drops by the one or more sensing devices, maximizing battery life of the one or more sensing devices and avoiding packet collision between the one or more sensing devices.

In another embodiment of the invention, the regulating device applies a tie-breaking logic when the ranking of two or more sensing devices is same.

In yet another embodiment of the invention, a regulating device is disclosed. The regulating device includes a receiver adapted to receive signal strength value from one or more sensing devices. The regulating device also includes a distance calculation unit adapted to determine an apparent distance between the regulating device and each of the one or more sensing devices based on the signal strength value. The regulating device further includes a ranking unit adapted to dynamically rank the one or more sensing devices based on the apparent distance and a configuration unit adapted to configure a communication interval for each of the one or more sensing devices based on the ranking of the one or more sensing devices. Lastly, the regulating device includes a transmitter adapted to transmit the communication interval to each of the one or more sensing devices.

In an embodiment of the invention, the communication interval includes a broadcasting interval and a connection interval for each of the one or more sensing devices while communicating with the regulating device.

In a further embodiment of the invention, an offset is added to the communication interval of sensing device in order of the ranking, wherein the offset is added to each of the sensing devices.

In yet another embodiment of the invention, adding the offset comprises adding a first offset to the connection interval and adding a second offset to the broadcast interval of the communication interval.

In a different embodiment of the invention, the ranking includes creating a list of the one or more sensing devices based on the apparent distance, wherein a sensing device with more apparent distance is ranked higher while a sensing device with less apparent distance is ranked lower.

In another embodiment of the invention, the higher ranked sensing device is more favorite sensing device in the list and the lower ranked sensing device is less favorite sensing device in the list.

In a further embodiment of the invention, the regulating device is further configured to determine failure count of received data packets from the sensing devices, wherein the ranking of the one or more sensing devices is further based on the failure count of received data packets and the apparent distance.

In yet another embodiment of the invention, the configuration of the communication interval includes increasing a communication time interval for the higher ranked sensing device and reducing a communication time interval for the lower ranked sensing device.

In another embodiment of the invention, the regulating device applies a tie-breaking logic when the ranking of two or more sensing devices is same.

In various other embodiments of the invention, a computer readable medium is disclosed comprising one or more processors and a memory coupled to the one or more processors. The memory stores instructions which are executed by the one or more processors to receive a signal strength value from one or more sensing devices and determine an apparent distance between a regulating device and each of the one or more sensing devices based on the signal strength value. The memory also stores instructions which are executed by the one or more processors to dynamically rank the one or more sensing devices based on the apparent distance and based on the ranking of the one or more sensing devices, configure a communication interval for each of the one or more sensing devices.

This summary is provided to introduce a selection of concepts in a simplified form from that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

Corresponding reference numerals indicate corresponding parts throughout the drawings.

DETAILED DESCRIPTION OF THE INVENTION

Figure 1:
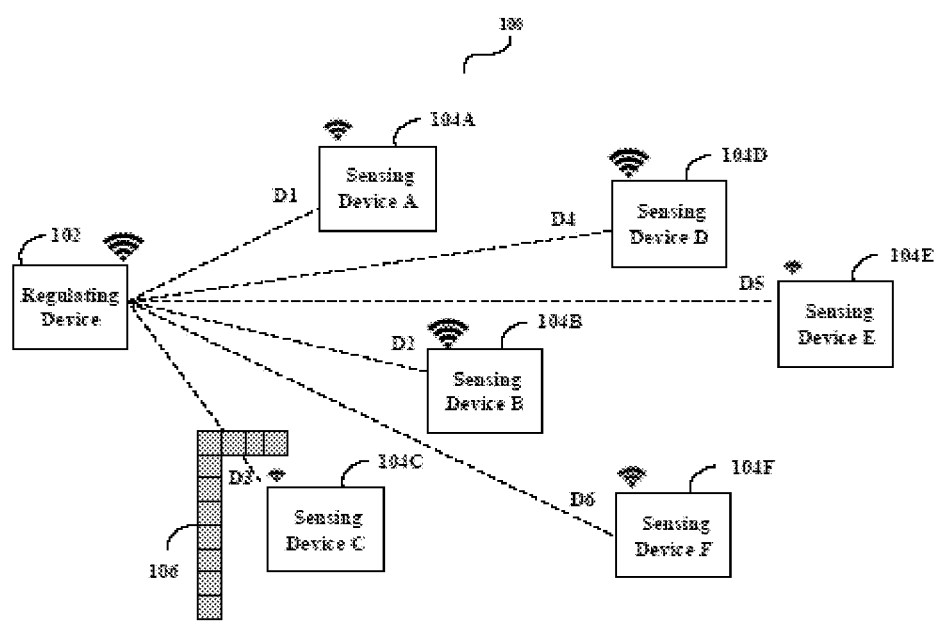
FIG. 1 depicts an exemplary architecture for configuring communication interval for sensing device/s, according to an exemplary embodiment of the invention.

Described herein is the technology for a system and a method for configuring a communication interval for one or more sensing devices. Further, the one or more sensing devices communicates with a regulating device through wireless communication.

As used herein, the one or more sensing devices may refer to sensor/s that possess the capability of sensing/monitoring one or more parameters. Such sensing devices may also have the capability of communicating with the regulating device and may transmit the sensed parameter information in the form of one or more packets to the regulating device through wireless communication. Also, the sensing devices can be installed at various locations in a particular area. For example, the sensing devices can be installed inside buildings, airport premises, railway stations and the like. The one or more sensing devices may include, but is not limited to, a temperature sensor, a gas sensor, a smoke sensor, a humidity sensor, fire sensor, air quality sensor, occupancy detector or any such sensor that is obvious to a person skilled in the art.

As used herein, the regulating device may refer to any device that is capable of remotely processing the packets received from the one or more sensing devices. The regulating device may configure a communication interval for one or more sensing devices and may perform operations and functions as described herein. In an embodiment, such regulating device may be a thermostat or any such device known in the art.

As used herein, the one or more parameters monitored by the one or more sensing devices may include, but not limited to, temperature, smoke, gas, fire, humidity, air quality level or any such parameter that is known in the art.

As used herein, the wireless communication may be established between the regulating device and the one or more sensing devices through a cellular network, a Wi-Fi network or a short-range network. The cellular network may refer to a Global System for Mobile (GSM) network, a Long-Term Evolution (LTE) network, a code-division multiple access (CDMA) network or any such network that is known in the art. The Wi-Fi network may refer to a network based on IEEE 802.11 Standards and provided by a WiFi access point. The short-range network may be a Bluetooth or a ZigBee based network.

Throughout the specification, reference numeral 104 can be considered as one or more sensing devices. The reference numeral 104A, 104B, 104C . . . 104F can each be considered as a single sensing device.

FIG. 1 depicts an exemplary architecture 100 for configuring communication interval for one or more sensing devices, according to an exemplary embodiment of the invention. The exemplary architecture 100 comprises a regulating device 102 and one or more sensing devices 104 wirelessly communicating with the regulating device 102. The one or more sensing devices 104 and/or the regulating device 102 may have a WiFi connectivity or a short-range connectivity. The one or more sensing devices 104 and the regulating device 102 may wirelessly communicate with each other using the network connectivity described above. Although the FIG. 1 depicts that the regulating device 102 and the one or more sensing devices 104 has WiFi connectivity; however, it is well-understood by a person skilled in the art that the regulating device 102 and the one or more sensing devices 104 may also have cellular connectivity or the short-range connectivity.

The regulating device 102 may measure signal strength of each of the one or more sensing devices 104 and accordingly, calculate a value of the signal strength of each of the one or more sensing devices 104. In particular, the regulating device 102 may calculate a value of the signal strength received by the one or more sensing devices 104 from respective network connectivity. The signal strength may be measured in decibel-milliwatts (dBm) and may also be called as "Received Signal Strength Indicator" (or RSSI). The signal strength of the one or more sensing devices 104 may be calculated by the regulating device 102 using equation (1):

$$\text{Signal Strength} = P_T - PL(d) \quad \text{Equation (1)}$$

where, $P_T$ is the sensing device 102 transmitted power in dBm, and

PL(d) is the path loss at a distance between the regulating device 102 and the one or more sensing devices 104 and can be calculated (in dBm) through the following equation and using Log Normal Shadowing Model (LNSM):

$$PL(d) = PL_0 + 10\eta \log 10(d/d_0) + X_\sigma \quad \text{Equation (2)}$$

Now, substituting the equation (2) in equation (1) to get the following equation:

$$\text{Signal Strength} = P_T - [PL_0 + 10\eta \log_{10}(d/d_0) + X_\sigma] \quad \text{Equation (3)}$$

where, $PL_0$ is the path loss at a reference distance $d_0$. $PL_0$ can be obtained from Friis equation or field measurements, $X_\sigma$ is a zero-mean Gaussian (normal) distributed random variable (in dB) with standard deviation σ (also in dB), and η is the path loss exponent. In practice, η and σ are calculated from measured signal strength.

$$\text{Signal Strength}_{avg} = (\text{previous averaged signal strength value} * 0.625) + (\text{current received signal strength value} * 0.375) \quad \text{Equation (4)}$$

where, the previous averaged signal strength value indicates average of the previous signal strength value of the one or more sensing devices 104, and the current received signal strength value indicates the instantaneous signal strength value of the one or more sensing devices 104.

Based on the value of the average measured signal strength of each of the one or more sensing devices 104, the regulating device 102 may determine an apparent distance (d) between the regulating device 102 and each of the one or more sensing devices 104. The apparent distance (d) may be calculated by given equation (5):

$$\text{Apparent distance}, d = d_0 \cdot 10^{-((\text{signalstrength}_{avg} - P_T + PL_0 - X_\sigma)/10\eta)} \quad \text{Equation (5)}$$

where, d is the apparent distance between the regulating device 102 and the one or more sensing devices 104.

After the apparent distance for each of the one or more sensing devices 104 is calculated, the regulating device 102 may dynamically rank the one or more sensing devices 104. The ranking may include creating a list of the one or more sensing devices 104 based on the apparent distance. A sensing device 104 with more apparent distance is ranked higher while the sensing device 104 with less apparent distance is ranked lower. Further, the higher ranked sensing device 104 is more favorite sensing device 104 in the list and the lower ranked sensing device 104 is less favorite sensing device 104 in the list.

Once the regulating device 102 ranks the one or more sensing devices 104, the regulating device may configure communication interval for the one or more sensing devices 104 based on the ranking of the one or more sensing devices 104. Further, the configuration of the communication interval includes increasing a communication time interval for the higher ranked sensing device 104 and reducing a communication time interval for the lower ranked sensing device 104. Furthermore, an offset is added to communication interval for each of the two or more sensing devices 104 in order of the ranking. Moreover, the offset comprises adding a first offset to a connection interval and adding a second offset to a broadcast interval of the communication interval of the one of the two or more sensing devices 104. The feature of adding offset is explained in details below with respect to an example.

As used herein, the communication interval may include a broadcast interval and/or a connection interval of the one or more sensing devices 104. The connection interval may refer to a time interval during which the one or more sensing devices 104 establish wireless connection with the regulating device 102. Such connection establishment may include pre-commissioning and commissioning procedures between the regulating device 102 and the one or more sensing devices 104.

As used herein, the broadcast interval may refer to a time interval during which the one or more sensing devices 104 may communicate with the regulating device 102 by broadcasting and/or transmitting packets to the regulating device 102 after the establishment of the wireless connection between the regulating device 102 and the one or more sensing devices 104.

The ranking and configuring communication interval for the one or more sensing devices 104 may be performed dynamically and regularly by the regulating device 102 in order to effectively rank the one or more sensing devices 104. In an exemplary embodiment, each of the sensing devices 104 may have a communication interval of 30 seconds by default and the offset of 2 seconds may be added to the sensing device based on the ranking of the sensing devices 104. For example, the ranking may be performed after a predetermined time. Further, the configuration of the communication interval is performed for minimizing packets drops by the one or more sensing devices 104, maximizing battery life of the one or more sensing devices 104 and avoiding packet collision between the one or more sensing devices 104. The ranking and configuring communication interval for the one or more sensing devices 104 has been explained in greater details below with an exemplary scenario.

Considering an exemplary Table 1 below with reference to FIG. 1, where a list of one or more sensing devices 104 has been created by the regulating device 102. The values in the exemplary Table 1 provided below are only for explanation purpose to enhance the intelligibility of the subject matter.

TABLE 1

| Sensing Device | Signal Strength of Sensing Device | Apparent Distance | Actual Distance | Ranking | Favorite |
|---|---|---|---|---|---|
| Sensing Device 104 A | −67 dBm | 2.5 meters (d1) | 2 meters | 3$^{rd}$ (High Rank) | Less Favorite |
| Sensing Device 104 B | −50 dBm | 1.5 meters (d2) | 2.5 meters | 5$^{th}$ (Lowest Rank) | Least Favorite |
| Sensing Device 104 C | −80 dBm | 4.5 meters (d3) | 1.5 meters | 2$^{nd}$ (Higher Rank) | More Favorite |
| Sensing Device 104 D | −57 dBm | 2 meters (d4) | 3 meters | 4$^{th}$ (Lower Rank) | Lesser Favorite |
| Sensing Device 104 E | −85 dBm | 5 meters (d5) | 3.5 meters | 1$^{st}$ (Highest Rank) | Most Favorite |
| Sensing Device 104 F | −70 dBm | 2.5 meters (d6) | 3 meters | 3$^{rd}$ (High Rank) | Less Favorite |

As per the list of the Table 1 above, the sensing device 104A is placed at an actual distance of 2 meters from the regulating device 102 and have signal strength value of −67 dBm. Also, the sensing device 104B is placed at an actual distance of 2.5 meters from the regulating device 102 and have signal strength value of −50 dBm. Similarly, the sensing device 104C is placed at an actual distance of 1.5 meters from the regulating device 102 and have signal strength value of −80 dBm. Although the sensing device 104C is placed very near to the regulating device 102, but the signal strength of the sensing device is low due to the presence of obstacle 106. Further, the sensing device 104D is placed at an actual distance of 3 meters from from the regulating device 102 and have signal strength value of −57 dBm. Furthermore, the sensing device 104E is placed at an actual distance of 3.5 meters from the regulating device 102 and have signal strength value of −85 dBm. Lastly, the sensing device 104F is placed at an actual distance of 3 meters from the regulating device 102 and have signal strength value of −70 dBm. It may be noted here that signal strength value in the range of the −30 dBm to −70 dBm may be considered as good signal strength. Any value of signal strength below this range may be considered as bad or poor signal strength. Further, the values in each column provided in Table 1 above are hypothetical and provided herein to only explain the present invention.

The Table 1 further shows the calculated apparent distance between the regulating device 102 and the one or more sensors 104 based on the signal strength value of each of the one or more sensors 104 (using Equation 5). In specific, the sensing device 104A is placed at an apparent distance of 2.5 meters (d1) from the regulating device 102 and the sensing device 104B is placed at an apparent distance of 1.5 meters (d2) from the regulating device 102. Also, the sensing device 104C is placed at an apparent distance of 4.5 meters (d3) from the regulating device 102 and the sensing device 104D is placed at an apparent distance of 2 meters (d4) from the regulating device 102. Also, the sensing device 104E is placed at an apparent distance of 5 meters (d5) from the regulating device 102 and the sensing device 104F is placed at an apparent distance of 2.5 meters (d6) from the regulating device 102.

As can be seen, the apparent distance and the actual distance are different for each of the one or more sensing devices 104 due to variations in the signal strength of these one or more sensing devices 104. Based on the calculated apparent distance of each of the one or more sensing devices 104, the one or more sensing devices 104 are ranked. Based on the ranking, the one or more sensing devices 104 are tagged or categorized as most favorite, more favorite, less favorite, lesser favorite, and/or least favorite and the like. For an instance, the sensing device 104E has the apparent distance of 5 meters which is the largest/highest of all the apparent distance of the other sensing devices 104, therefore, the sensing device 104E is ranked highest (i.e. at first rank) and tagged as "Most Favorite". Further, the sensing device 104C has the apparent distance of 4.5 meters which is the second largest/highest of all the apparent distance of the other sensing devices 104, therefore, the sensing device 104C is ranked higher (i.e. at second rank) and tagged as "More Favorite". Furthermore, the sensing device 104A and the sensing device 104F have the same/equal apparent distance of 2.5 meters which is the third largest/highest of all the apparent distance of the other sensing devices 104, therefore, both of the sensing device 104A and the sensing device 104F have been ranked high (i.e. at third rank) and tagged as "Less Favorite". Moreover, the sensing device 104D has the apparent distance of 2 meters which is the second lowest apparent distance of all the apparent distance of the other sensing devices 104, therefore, the sensing device 104D is ranked lower (i.e. at fourth rank) and tagged as "Lesser Favorite". Lastly, the sensing device 104B has the apparent distance of 1.5 meters which is the lowest apparent distance of all the apparent distance of the other sensing devices 104, therefore, the sensing device 104B is ranked lowest (i.e. at fifth rank) and tagged as "Least Favorite".

Moreover, in order to rank the one or more sensing devices 104, the regulating device 102 may compare the calculated apparent distance of each of the one or more sensing devices 104 with a pre-defined threshold of the apparent distance. Also, based on the exemplary Table 1, the sensing device 104E is ranked 1$^{st}$ and tagged as "Most Favorite" as the value of the calculated apparent distance of these sensing devices 104C/104E are below the pre-defined threshold of the apparent distance. Such pre-defined threshold of the apparent distance may be defined by the regulating device 102 or a user of the regulating device 102.

As the sensing device 104E is ranked at 1$^{st}$ position (Highest) and tagged as "Most Favorite", the communication interval of the sensing device 104E may be configured i.e. increased by an offset. That is, broadcast interval and connection interval for the sensing device 104E have been increased by a offset value. With respect to the exemplary Table 1 above, the broadcast interval for the sensing device 104E may be increased by offset value of 5 seconds and the connection interval for the sensing device 104E may be increased by offset value of 3 seconds. It is to be noted that the connection interval and the broadcast interval may be different and are decided by the regulating device 102 based on the ranking. Similarly, the sensing device 104C is ranked at 2$^{nd}$ position (Higher) and tagged as "More Favorite", therefore, the broadcast interval of the sensing device 104C may be configured i.e. increased by a offset value of 4 seconds and the connection interval of the sensing device 104C is increased by a offset value of 2 seconds. Alternatively, both of the connection interval and the broadcast interval for the sensing devices 104 may be increased or decreased by same offset value. With regard to the other sensing devices 104A/104B/104D/104F which are ranked below the sensing device 104E and the sensing device 104C, the broadcast interval and the connection interval of these sensing devices 104A/104B/104D/104F may be decreased by the regulating device 102 by offset values.

The present invention also encompasses the regulating device 102 to apply tie-breaker logic when the ranking of two or more sensing devices 104 are same/equal. In such situation, the regulating device 102 may apply the tie-breaker logic to determine the ranking. For an instance in Table 1, the sensing device 104A and the sensing device 104F are both placed at an equal apparent distance of 2.5 meters from the regulating device 102 and are at the same ranking (i.e. $3^{rd}$ at rank). In such situation, the regulating device 102 may apply the tie-breaker logic to determine appropriate ranking for the sensing device 104A and the sensing device 104F in order to break the tie between the two sensing devices 104A/104F and may rank provide higher rank to any of these sensing devices 104A/104F based on parameters like actual distance, packet failure etc. The tie-breaker logic may also provide different time offset values for the same ranked sensing devices. For an example, the tie-breaker logic may add 2 seconds for the communication interval of the sensing device 104A as the sensing device 104A have less number of packets dropped as compared to the sensing device 104F. Such application of tie-breaker logic by the regulating device 102 avoids collision between the packets of the sensing device 104A and the sensing device 104F.

The present invention further facilitates the regulating device 102 to determine failure count of received data packets from the one or more sensing devices 104. The determination of the packets failure may be performed by counting the number of packets transmitted by each of the one or more sensing devices 104 which may fail to reach the regulating device 102. Such failure of packets may happen in the transmission path between the regulating device 102 and the one or more sensing devices 104 due to presence of obstacles (such as wall, buildings etc.) in the transmission path or bad weather conditions. Based on the failure count of received data packets and the apparent distance, the ranking of the one or more sensing devices 104 can be performed by the regulating device 102.

Figure 2:
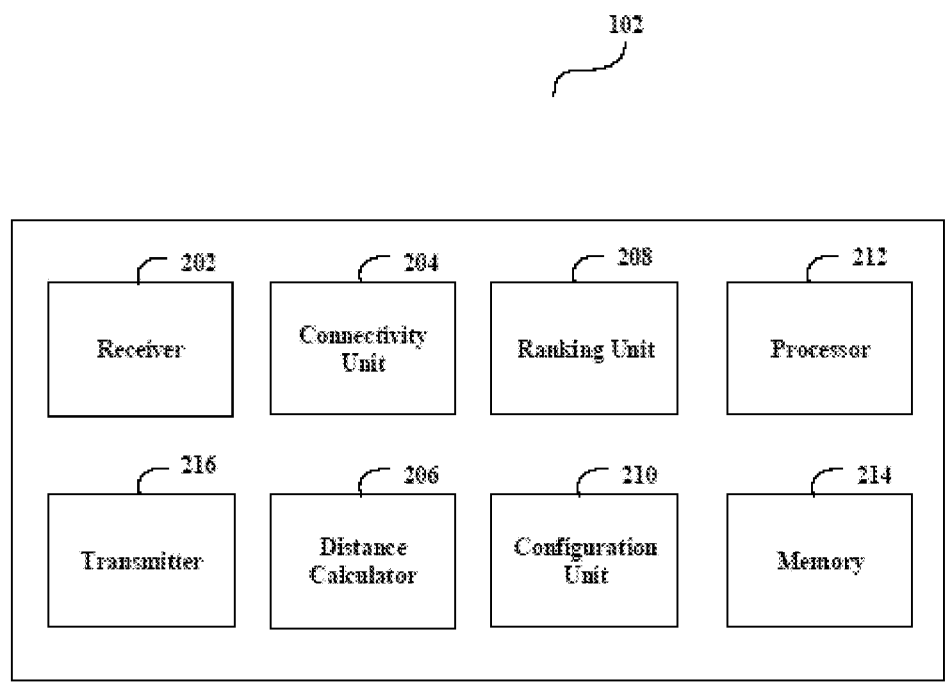
FIG. 2 depicts block diagram of different components in a regulating device according to an exemplary embodiment of the invention.

FIG. 2 depicts block diagram of different components in a regulating device 102 according to an exemplary embodiment of the invention. The regulating device 102 comprises a receiver 202, a connectivity unit 204, a distance calculation unit 206, a ranking unit 208, a configuration unit 210, a processor 212, a memory 214 and a transmitter 216. The connectivity unit 204 of the regulating device 102 may be adapted to provide connectivity to the regulating device 102 using which the regulating device 102 may wirelessly communicate with the one or more sensing devices 104. The receiver 202 of the regulating device 102 may be adapted to receive signal strength value from each of the one or more sensing devices 104. The values of the signal strength for each of the one or more sensing devices 104 may be determined by the processor 212. Further, the distance calculation unit 206 may be adapted to determine an apparent distance between the regulating device 102 and each of the one or more sensing devices 104 based on the signal strength value. The distance calculation unit 206 may use Equation 5 mentioned above to calculate the apparent distance. The distance calculation unit 206 may also calculate the actual distance between the regulating device 102 and each of the one or more sensing devices 104 based on known techniques.

The ranking unit 208 may be adapted to dynamically rank the one or more sensing devices 104 based on the apparent distance as explained above in Table 1. And, the configuration unit 210 may be adapted to configure a communication interval for each of the one or more sensing devices 104 based on the ranking of the one or more sensing devices 104 as explained above in details. Then, the transmitter 216 may be adapted to transmit the communication interval to each of the one or more sensing devices. The memory 214 of the regulating device 102 may be adapted to store identifiers of the one or more sensing devices 104, apparent distance (d) between the regulating device 102 and each of the one or more sensing devices 104, the value of signal strength of each of the one or more sensing devices 104 and any such information that is obvious to a person skilled in the art. Further, the receiver 202, the connectivity unit 204, the distance calculation unit 206, the ranking unit 208, the configuration unit 210, the memory 214 and/or the transmitter 216 may be communicably coupled with the processor 212.

Figure 3:
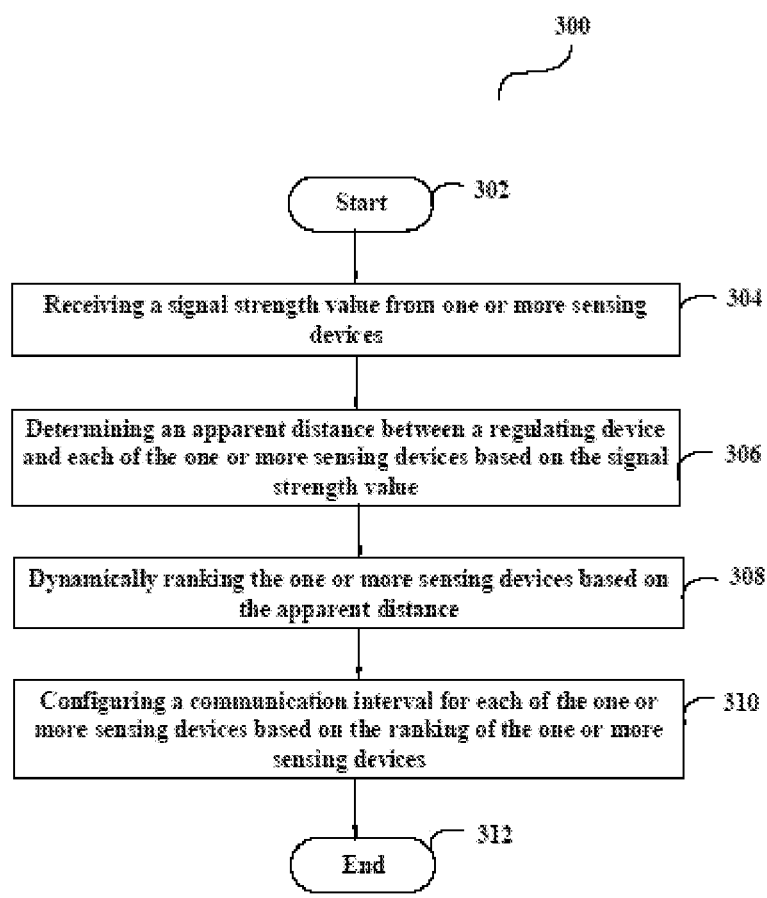
FIG. 3 depicts an exemplary flowchart illustrating a method to perform the invention according to an exemplary embodiment of the invention.

FIG. 3 depicts an exemplary flowchart illustrating a method to perform the invention according to an exemplary embodiment of the invention. The method flowchart 300 describes a method being performed for enabling the invention. The method flowchart 300 starts at step 302.

At step 304, the regulating device 102 may receive a value of the measured signal strength of respective connectivity from each of the one or more sensing devices 104. The signal strength of the one or more sensing devices 104 may be measured using Equation 1 to Equation 4.

At step 306, based on the value of the measured signal strength of each of the one or more sensing devices 104, the regulating device 102 may determine an apparent distance (d) between the regulating device 102 and each of the one or more sensing devices 104. The apparent distance (d) may be calculated by using the Equation 5.

At step 308, the regulating device 102 may dynamically rank the one or more sensing devices 104 based on the apparent distance for each of the one or more sensing devices 104. The ranking may include creating a list of the one or more sensing devices 104 based on the calculated apparent distance. A sensing device 104 with more apparent distance is ranked higher while the sensing device 104 with less apparent distance is ranked lower. Further, the higher ranked sensing device 104 is more favorite sensing device 104 in the list and the lower ranked sensing device 104 is less favorite sensing device 104 in the list. The ranking of the one or more sensing devices 104 may be done by the regulating device 102 as discussed in the exemplary Table 1 above.

At step 310, the regulating device 102 may configure a communication interval for the one or more sensing devices 104 based on the ranking of the one or more sensing devices 104. Further, the configuration of the communication interval includes increasing a communication time interval for the higher ranked sensing device 104 and reducing a communication time interval for the lower ranked sensing device 104. The method flowchart ends at 312.

The present invention is applicable in various fields such as, but not limited to, heating, ventilation, and air conditioning (HVAC) systems, smart metering systems, facility management services, intruder and fire alarm systems, connected personal appliances, tracking of person/animal/object, smart city infrastructure, connected industrial appliances (like welding machine, air compressors), healthcare, residential area, a building, commercial buildings, and any such field that is obvious to a person skilled in the art.

The present invention provides the following technical advantages over the existing methods and systems: a) minimizes packet losses between the regulating device and the one or more sensing devices by configuring communication interval for the one or more sensing devices, b) maximizes battery life of the one or more sensing devices by configuring communication interval for the one or more sensing devices, c) avoids collision between packets of the one or more sensing devices by configuring communication interval for the one or more sensing devices, and d) provides effective communication between the regulating device and the one or more sensing devices by allowing more favorite sensing devices to communicate faster than the other less favorite sensing devices, e) using apparent distance to rank the sensing devices as more favorite sensing devices and/or less favorite sensing devices, and f) improves multi-path reception of packets.

The embodiments of the invention discussed herein are exemplary and various modification and alterations to a known person skilled in the art are within the scope of the invention.

In one embodiment of the invention, the invention can be operated using the one or more computer readable devices comprising a computer readable medium. The one or more computer readable devices can be associated with the regulating device 102. The computer readable medium of the computer readable devices is configured to receive a signal strength value from one or more sensing devices 104 and determine an apparent distance between a regulating device 102 and each of the one or more sensing devices 104 based on the signal strength value. The computer readable medium of the computer readable devices is further configured to dynamically rank the one or more sensing devices 104 based on the apparent distance and based on the ranking of the one or more sensing devices 104, configure a communication interval for each of the one or more sensing devices 104.

Exemplary computer readable media includes flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purpose or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures and described herein. Other examples of the invention may include different computer-executable instructions or components having more or less functionality than illustrated and described herein.

Aspects of the invention transform a general-purpose computer into a special-purpose computing device when configured to execute the instructions described herein.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C".

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
receiving a signal strength value from one or more sensing devices;
determining an apparent distance between a regulating device and each of the one or more sensing devices based on the signal strength value;
dynamically ranking the one or more sensing devices based on the apparent distance; and
configuring a communication interval for each of the one or more sensing devices based on the ranking of the one or more sensing devices;
the ranking includes creating a list of the one or more sensing devices based on the apparent distance, a sensing device of the one or more sensing devices with more apparent distance is ranked higher and a sensing device of the one or more sensing devices with less apparent distance is ranked lower;

the higher ranked sensing device is a more favorite sensing device in the list and the lower ranked sensing device is a less favorite sensing device in the list;

wherein the configuring of the communication interval includes increasing a communication time interval for the higher ranked sensing device and reducing a communication time interval for the lower ranked sensing device.

2. The method of claim 1, the communication interval includes a broadcasting interval and a connection interval for each of the one or more sensing devices while communicating with the regulating device.

3. The method of claim 1, the apparent distance is determined based on the signal strength value received from each of the one or more sensing devices.

4. The method of claim 1, an offset is added to the communication interval of each of the sensing device in order of the ranking, the offset is added to each of the sensing devices.

5. The method of claim 4, adding the offset comprises adding a first offset to the connection interval and adding a second offset to the broadcast interval of the communication interval.

6. The method of claim 1, the regulating device is further configured to determine a failure count of received data packets from the sensing devices, the ranking of the one or more sensing devices is further based on the failure count of received data packets and the apparent distance.

7. The method of claim 1, the configuration of the communication interval is performed for minimizing packets drops by the one or more sensing devices, maximizing battery life of the one or more sensing devices and avoiding packet collision between the one or more sensing devices.

8. The method of claim 1, the regulating device applies a tie-breaking logic when the ranking of two or more sensing devices is same.

9. A regulating device comprising:
a receiver to receive signal strength value from one or more sensing devices;
a distance calculation unit to determine an apparent distance between the regulating device and each of the one or more sensing devices based on the signal strength value;
a ranking unit to dynamically rank the one or more sensing devices based on the apparent distance;
a configuration unit to a configure a communication interval for each of the one or more sensing devices based on the ranking of the one or more sensing devices, and a transmitter to transmit the communication interval to each of the one or more sensing devices;
the ranking includes creating a list of the one or more sensing devices based on the apparent distance, a sensing device of the one or more sensing devices with more apparent distance is ranked higher while a sensing device of the one or more sensing devices with less apparent distance is ranked lower;
the higher ranked sensing device is a more favorite sensing device in the list and the lower ranked sensing device is a less favorite sensing device in the list;
wherein the configuration unit configuring the communication interval includes increasing a communication time interval for the higher ranked sensing device and reducing a communication time interval for the lower ranked sensing device.

10. The regulating device of claim 9, the communication interval includes a broadcasting interval and a connection interval for each of the one or more sensing devices while communicating with the regulating device.

11. The regulating device of claim 9, an offset is added to the communication interval of each of sensing device in order of the ranking, the offset is added to each of the sensing devices.

12. The regulating device of claim 11, adding the offset comprises adding a first offset to the connection interval and adding a second offset to the broadcast interval of the communication interval.

13. The regulating device of claim 9, the regulating device is further configured to determine a failure count of received data packets from the sensing devices, the ranking of the one or more sensing devices is further based on the failure count of received data packets and the apparent distance.

14. A computer readable medium comprising a non-transitory memory, the memory storing instructions which are executed by one or more processors, the one or more processors configured to:
receive a signal strength value from one or more sensing devices;
determine an apparent distance between a regulating device and each of the one or more sensing devices based on the signal strength value;
dynamically rank the one or more sensing devices based on the apparent distance; and
configure a communication interval for each of the one or more sensing devices based on the ranking of the one or more sensing devices;
the ranking includes creating a list of the one or more sensing devices based on the apparent distance, a sensing device of the one or more sensing devices with more apparent distance is ranked higher and a sensing device of the one or more sensing devices with less apparent distance is ranked lower;
the higher ranked sensing device is a more favorite sensing device in the list and the lower ranked sensing device is a less favorite sensing device in the list;
wherein the configuring of the communication interval includes increasing a communication time interval for the higher ranked sensing device and reducing a communication time interval for the lower ranked sensing device.

* * * * *